United States Patent
Scott et al.

(10) Patent No.: US 8,866,338 B2
(45) Date of Patent: Oct. 21, 2014

(54) METHOD AND APPARATUS FOR IMPROVING POWER GENERATION IN A THERMAL POWER PLANT

(75) Inventors: Brian David Scott, Apex, NC (US); David Larsson, Apex, NC (US)

(73) Assignee: ABB Inc., Cary, NC (US)

( * ) Notice: Subject to any disclaimer, the term of this patent is extended or adjusted under 35 U.S.C. 154(b) by 837 days.

(21) Appl. No.: 13/011,528

(22) Filed: Jan. 21, 2011

(65) Prior Publication Data

US 2011/0181044 A1     Jul. 28, 2011

Related U.S. Application Data

(60) Provisional application No. 61/297,672, filed on Jan. 22, 2010.

(51) Int. Cl.
*H02J 1/00* (2006.01)
*H02J 1/10* (2006.01)
*G05F 1/00* (2006.01)
*H02J 3/18* (2006.01)

(52) U.S. Cl.
CPC ............... *H02J 3/1864* (2013.01); *Y02E 40/12* (2013.01)
USPC .................. 307/43; 307/103; 323/211; 290/7

(58) Field of Classification Search
None
See application file for complete search history.

(56) References Cited

U.S. PATENT DOCUMENTS

| | | | |
|---|---|---|---|
| 4,438,386 A | 3/1984 | Gyugyi | |
| 7,038,329 B1 | 5/2006 | Fredette et al. | |
| 2005/0194944 A1* | 9/2005 | Folts et al. | 323/209 |
| 2008/0157728 A1 | 7/2008 | Toki et al. | |
| 2012/0104850 A1* | 5/2012 | Fallis et al. | 307/31 |
| 2012/0248874 A1* | 10/2012 | Pan et al. | 307/64 |

FOREIGN PATENT DOCUMENTS

| | | |
|---|---|---|
| GB | 2142491 A | 1/1985 |
| WO | 2011091267 | 7/2011 |

* cited by examiner

*Primary Examiner* — Jared Fureman
*Assistant Examiner* — Aqeel Bukhari
(74) *Attorney, Agent, or Firm* — Paul R. Katterle (57) ABSTRACT

A method and apparatus for improving power generation in a thermal power plant. A dynamic reactive compensation system is provided and is connected to a high voltage bus or a generator bus of the power plant. The dynamic reactive compensation system comprises power electronic devices and is operable to provide most of the reactive power that is required from the power plant.

20 Claims, 11 Drawing Sheets

METHOD AND APPARATUS FOR IMPROVING POWER GENERATION IN A THERMAL POWER PLANT

CROSS-REFERENCE TO RELATED APPLICATION

This application claims the benefit of U.S. provisional patent application No. 61/297,672 filed on Jan. 22, 2010, which is hereby incorporated by reference in its entirety.

BACKGROUND OF THE INVENTION

The present invention relates to thermal power plants and more particularly to methods and apparatus for improving power generation in thermal power plants.

The portion of power flow that results in a net transfer of energy in one direction (over a complete AC waveform cycle) is known as real power (or useful or active power). That portion of power flow that is due to stored energy in the load returning to the source in each cycle is known as reactive power. Apparent power is the vector sum of real and reactive power.

The power factor of an AC power system is defined as the ratio of real power to apparent power, and is a number between 0 and 1. Where the waveforms are purely sinusoidal, the power factor is the cosine of the phase angle ($\phi$) between the current and voltage sinusoid waveforms. Power factor equals 1 when the voltage and current are in phase, and is zero when the current leads or lags the voltage by 90 degrees. If the load is purely reactive, then the voltage and current are 90 degrees out of phase and there is no net energy flow. Power factors are usually identified as "leading" or "lagging" to show the sign of the phase angle, where leading indicates a negative sign.

For two AC power systems transmitting the same amount of real power, the system with the lower power factor will have higher circulating currents due to energy that returns to the source from energy storage in the load. These higher currents in a power system will produce higher losses and reduce overall transmission efficiency. A lower power factor circuit will have a higher apparent power and higher losses for the same amount of real power transfer. Thus, it is desirable to maintain a high power factor in an AC power system.

Transmission operators, such as independent service operators (ISO's) and regional transmission operators (RSO's), compensate power generators for real power, which is given in megawatts (MWs), but typically do not compensate power generators for reactive power, which is given in mega volt-amperes reactive (MVar's). Reactive power, however, is necessary to maintain adequate voltage levels on a power grid. Without such voltage support, the transfer and distribution of real power would be adversely affected. For this reason, a transmission operator often requires a power generator to provide a certain amount of reactive power in order to connect to a power grid run by the transmission operator. Typically, the provision of such required reactive power reduces the amount of real power that a power generator could otherwise supply and reduces the power factor of the power generated by the power generator.

The present invention is directed to a method and apparatus for improving the supply of power from a thermal power generator.

SUMMARY OF THE INVENTION

In accordance with the present invention, a method is provided for improving power generation in a thermal power plant having a power generator connected to a high voltage bus. In accordance with the method, a dynamic reactive compensation system (DRCS) is provided that includes one or more power electronic devices. The DRCS is connected to the high voltage bus of the power plant and is operated to provide most of the reactive power required to be provided from the thermal power plant.

Also provided in accordance with the present invention is a thermal power plant that includes a high voltage bus for connection to a transmission network. A power generator is connected to the high voltage bus. A dynamic reactive compensation system (DRCS) is connected to the high voltage bus and includes one or more power electronic devices. The DRCS is operable to provide most of the reactive power required to be provided from the thermal power plant.

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Figure 1:
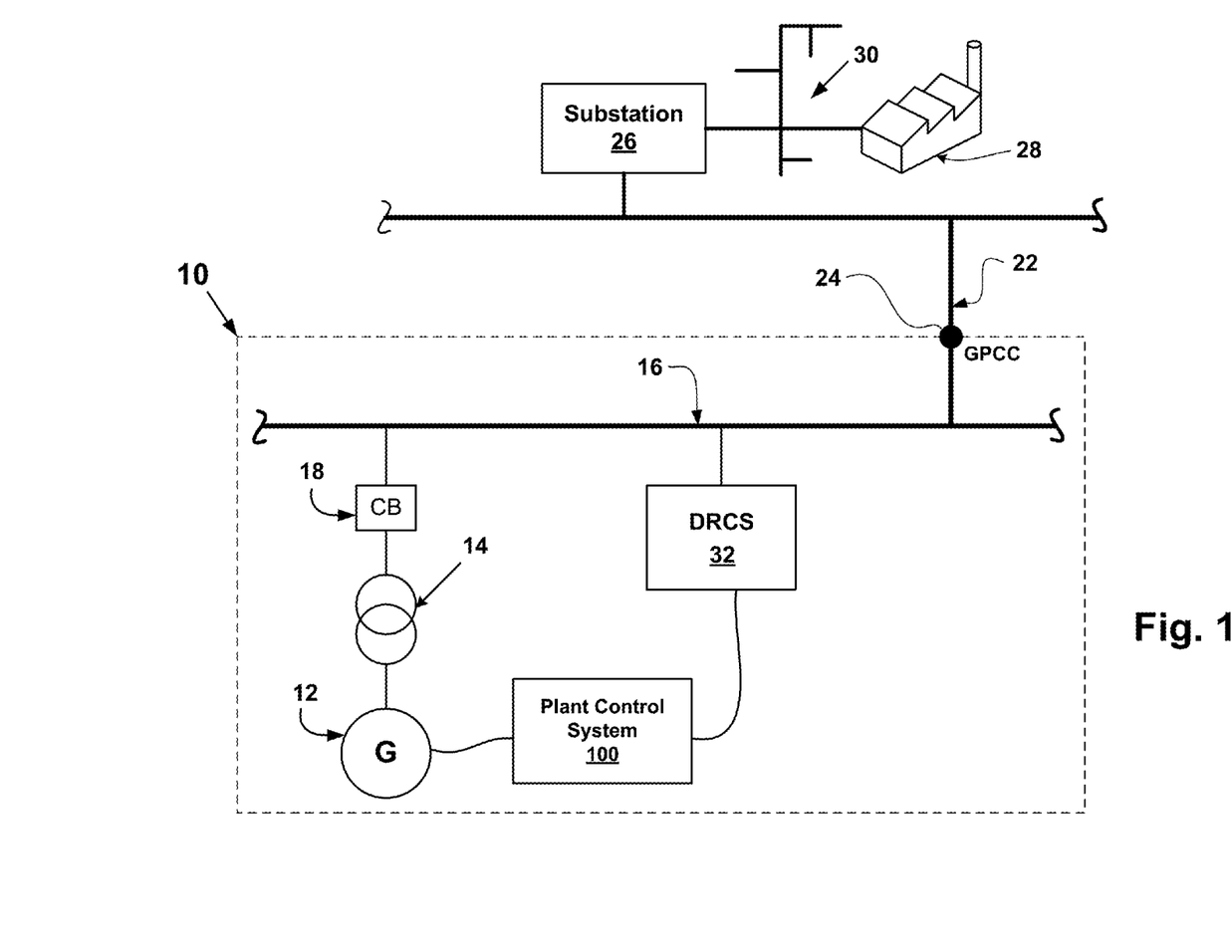
FIG. 1 is a schematic drawing of a power generation station in which the method and apparatus of the present invention may be utilized.

Referring now to FIG. 1 there is shown a schematic drawing of a power generation station 10 in which the method and apparatus of the present invention may be utilized. The generation station 10 may be a thermal power plant, such as a coal-fired power plant, a nuclear power plant, a solar power plant, or a geothermal power plant. The generation station 10 includes a generator 12 that generates electricity from mechanical energy supplied by one or more steam-driven turbines (not shown). The output of the generator 12 typically has a voltage in a range of from about 2 kV to about 30 kV. A step-up main transformer 14 converts the electrical power from the generator 12 to a voltage which is suitable for transmission, e.g. greater than 110 kV. The main transformer 14 is connected to a high voltage bus 16 by a circuit breaker 18. The high voltage bus 16, in turn, is connected to a transmission network 22 at a generator point of common coupling (GPCC) 24. The high voltage bus 16 typically has a voltage in a range from about 30 kV to about 765 kV or more. One or more substations 26 are connected to the transmission network 22. Each substation 26 steps down the voltage and provides the generated power to end user customers 28 through a distribution network 30. The transmission network 22 and the distribution network 30 help form a power grid.

Inside the generation station 10, a dynamic reactive compensation system (DRCS) 32 is directly shunt-connected to the high voltage bus 16, i.e., is connected to the high voltage bus 16 in parallel with the generator 12. The DRCS 32 is located adjacent to, or inside of, a switch yard of the generation station 10. The DRCS 32 is used to increase the real power output of the generation station 10. The DRCS 32 dynamically provides most of the reactive power that is required from the generation station 10, while the generator 12 provides the real or active power that is required from the generation station 10. By providing most of the reactive power from the DRCS 32 rather than the generator 12, the generator 12 can provide more active power and still remain within a specified power factor range. Of course, the generator 12 will still provide a small amount of reactive power. The DRCS 32 typically provides MVar's in ranges from ±1 MVar to ±600 Mvar or greater. As a result of the installation of the DRCS 32 in the generation station 10, the amount of real power that is output by the generation station 10 (generator 12) can be increased from 0 to about 15%, more typically from about 5% to about 15%, still more typically from about 5% to about 10%, while meeting a required power factor. In addition, the generator 12 can be operated very close to its rated real power output, typically from about 95% to about 99.8%.

Figure 2:
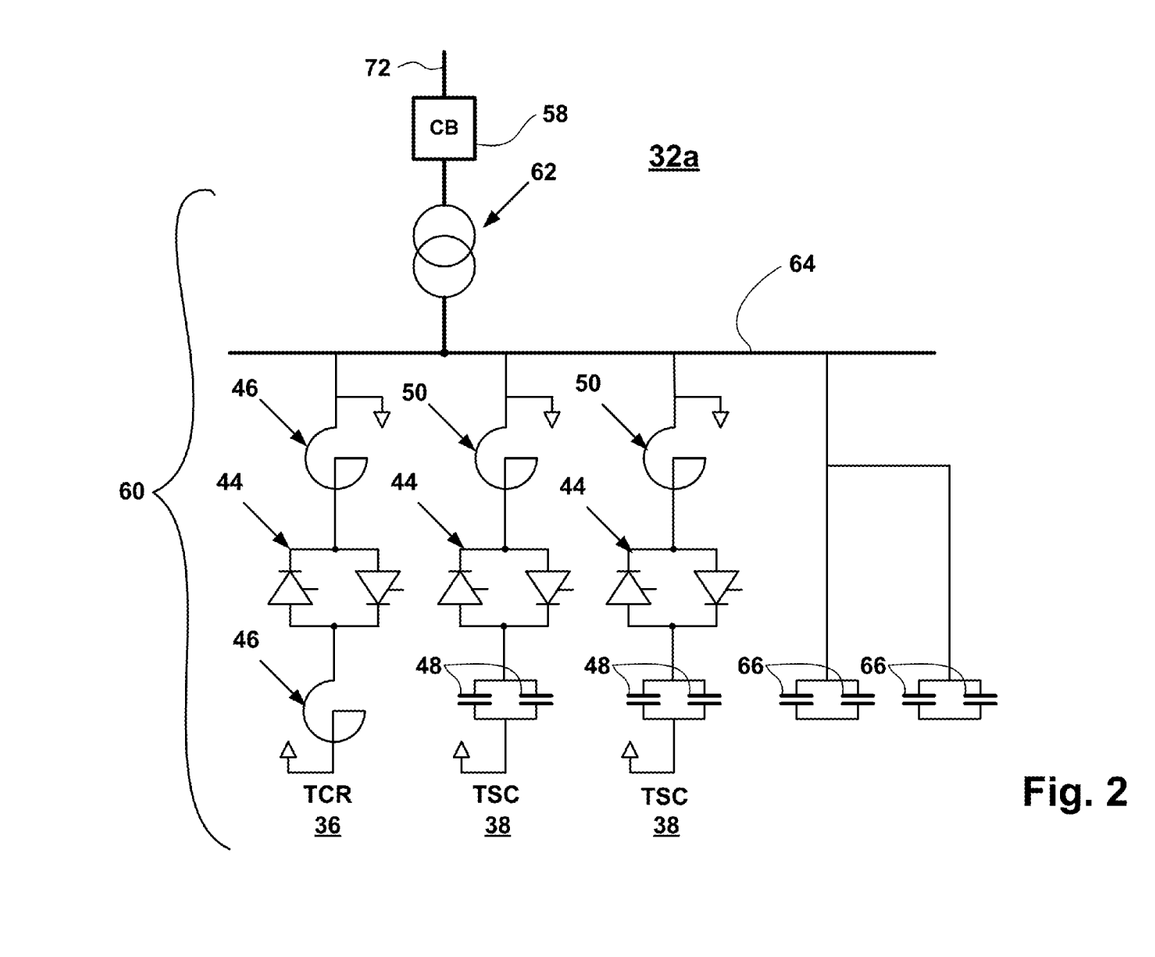
FIG. 2 is a circuit schematic of a first embodiment of a dynamic reactive compensation system (DRCS) that may be used in the generation station.
Figure 3:
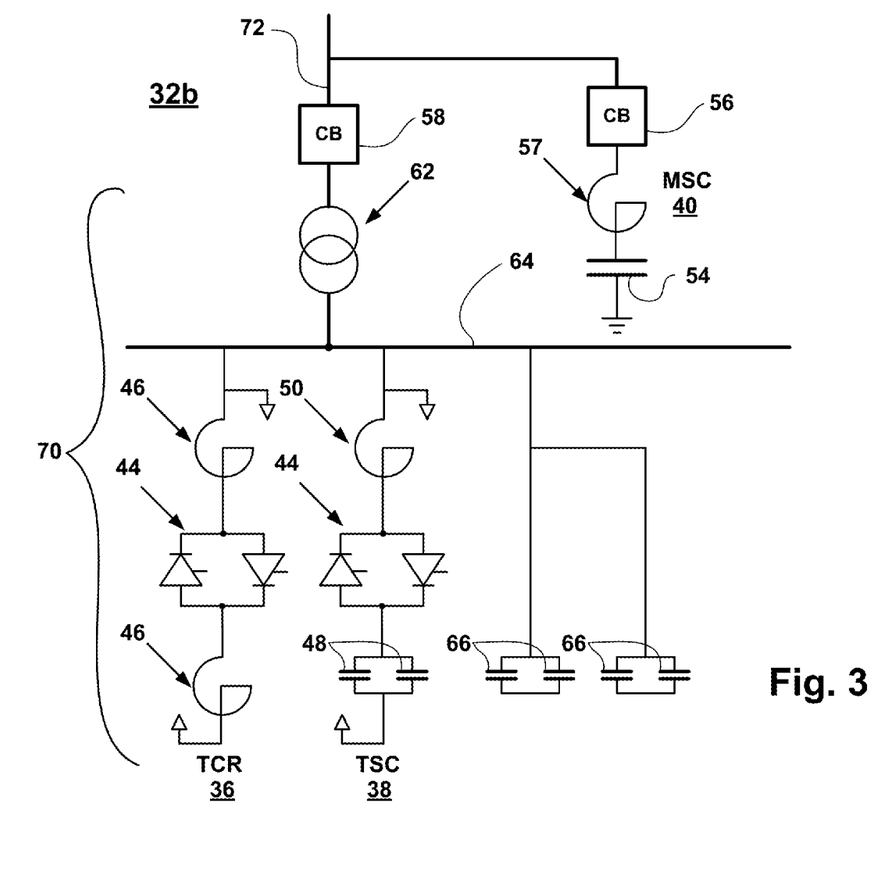
FIG. 3 is a circuit schematic of a second embodiment of the DRCS that may be used in the generation station.
Figure 4:
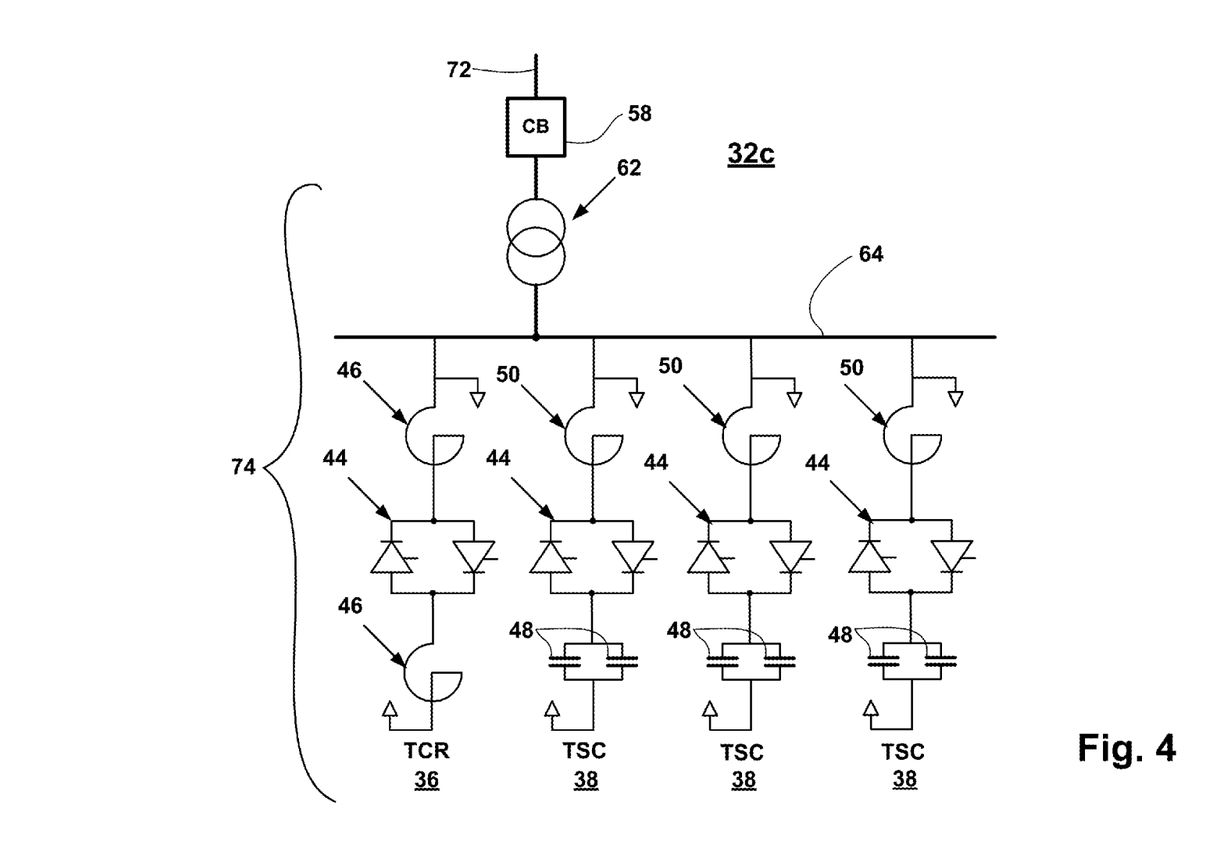
FIG. 4 is a circuit schematic of a third embodiment of the DRCS that may be used in the generation station.
Figure 5:
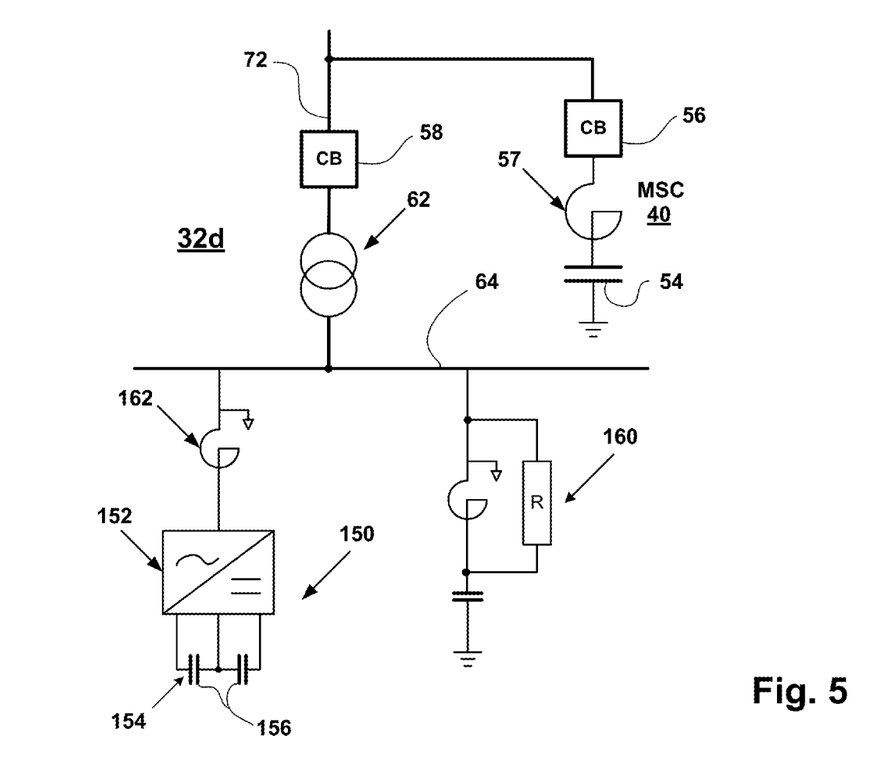
FIG. 5 is a circuit schematic of a fourth embodiment of the DRCS that may be used in the generation station.

The DRCS 32 may be constructed in accordance of one of a plurality of different embodiments. A first one of these embodiments, designated by the reference numeral 32*a*, is shown in FIG. 2; a second one of these embodiments, designated by the reference numeral 32*b* is shown in FIG. 3; a third one of these embodiments, designated by the reference numeral 32*c* is shown in FIG. 4; and a fourth one of these embodiments, designated by the reference numeral 32*d* is shown in FIG. 5. Each embodiment of the DRCS 32 comprises one or more of the following devices: a thyristor controlled reactor (TCR) 36, a thyristor switched capacitor (TSC) 38, a mechanically switched capacitor (MSC) 40 and a voltage source converter (VSC) system 150.

The TCR 36 (shown in FIGS. 2-4) is operable to supply negative reactive power on a stepped basis or a continuous, variable basis. The TCR 36 comprises a bi-directional thyristor valve 44 connected in series with one or more large reactors (inductors) 46. In the shown embodiment of the TCR 36, the thyristor valve 44 is connected between a pair of reactors 46. The use of two reactors 46 limits the fault current through the thyristor valve 44 should one of the reactors 46 fail, such as could occur as a result of shorted turns or a flashover. When operating on a continuous basis, the thyristor valve 44 conducts on alternate half-cycles of the supply frequency depending on a firing angle measured from a zero crossing of voltage. Changing the firing angle changes the negative reactive power supplied by the TCR 36. When operating on a continuous basis, the TCR 36 produces harmonic currents because the thyristor valve 44 only allows conduction in the reactors 46 for a portion of the cycle.

The TSC 38 (shown in FIGS. 2-4) is operable to supply positive reactive power in a switched (stepped) manner. The TSC 38 comprises a bi-directional thyristor valve 44 connected in series with one or more capacitors 48. In the shown embodiment of the TSC 38, the thyristor valve 44 is connected between a small reactor 50 and a plurality of parallel-connected capacitors 48. The reactor 50 permits the TSC 38 to be tuned to a desired harmonic frequency and minimizes in-rush currents. The TSC 38 supplies positive reactive power when the thyristor valve 44 conducts.

The MSC 40 (shown in FIGS. 3 and 5) comprises one or more capacitors 54 connected to a circuit breaker 56. A small reactor 57 may be connected in series with the capacitor 54 and the circuit breaker 56. When the circuit breaker 56 is closed, the MSC 40 supplies positive reactive power.

The VSC 150 system (shown in FIG. 5) comprises a VSC 152 connected in parallel to a DC bridge or bus 154 comprising one or more capacitors 156. A DC voltage from the DC bus 154 is converted to a sinusoidal AC voltage by the VSC 152. The VSC 152 includes a plurality of switching bridges connected in parallel. Each switching bridge comprises two or more switching devices. Each switching device may be an insulated gate bipolar transistor (IGBT) and an anti-parallel diode. A controller controls the operation of the switching devices using pulse width modulation (PWM), wherein the switching devices are opened and closed to create a series of voltage pulses, wherein the average voltage is the peak voltage times the duty cycle, i.e., the "on" and "off" times of pulses. In this manner, a sine wave can be approximated using a series of variable-width positive and negative voltage pulses. The phase and the amplitude of the sine wave can be changed by changing the PWM pattern. In this manner, the controller can produce any desired reactive power.

Referring now to FIG. 2, the DRCS 32*a* comprises a circuit breaker 58 and a single large static VAR compensator (SVC) 60 that is operable to supply continuously variable reactive power over a required range to the high voltage bus 16. The SVC 60 comprises a step-down transformer 62, one TCR 36 operating in a continuous manner and two TSC's 38 operating in a stepped manner. The TCR 36 and the TSC's 38 are connected to an DRCS bus 64. A bank of harmonic capacitors 66 may also be connected to the DRCS bus 64. The harmonic capacitors 66 are operable to filter the harmonics produced by the TCR 36. The TCR 36, the TSC's 38 and the bank of harmonic capacitors 66 are connected in parallel. The primary side of the transformer 62 is connected to the high voltage bus 16 by a line 72 with a circuit breaker 58 connected therein. The secondary side of the transformer 62 is connected to the DRCS bus 64.

Referring now to FIG. 3, the DRCS 32*b* comprises a circuit breaker 58, an SVC 70 and an MSC 40. Together, the SVC 70 and the MSC 40 are operable to supply reactive power over a required range to the high voltage bus 16. The SVC 70 is smaller than the SVC 60 and comprises a step-down transformer 62, one TCR 36 operating in a continuous manner and one TSC 38 operating in a stepped manner. Both the TCR 36 and the TSC 38 are connected to an DRCS bus 64. The SVC 70 is operable to supply continuously variable reactive power and is sized to cover the full negative reactive power range. A bank of harmonic capacitors 66 may also be connected to the DRCS bus 64. Once again, the harmonic capacitors 66 are operable to filter the harmonics produced by the TCR 36. The TCR 36, the TSC 38 and the bank of harmonic capacitors 66 are connected in parallel. The primary side of the transformer 62 is connected to the high voltage bus 16 by a line 72 with a circuit breaker 58 connected therein. The secondary side of the transformer 62 is connected to the DRCS bus 64. The MSC 40 is connected to the line 72 and is operable to supply positive reactive power in a stepped manner.

Referring now to FIG. 4, the DRCS 32c comprises a circuit breaker 58 and a single large SVC 74 that is operable, in a stepped manner, to supply reactive power over a required range to the high voltage bus 16. The SVC 74 comprises a step-down transformer 62, one TCR 36 operating in a stepped manner and three TSC's 38 operating in a stepped manner. The TCR 36 and the TSC's 38 are connected to an DRCS bus 64 and in a parallel manner to each other. The primary side of the transformer 62 is connected to the high voltage bus 16 by a line 72 with a circuit breaker 58 connected therein. The secondary side of the transformer 62 is connected to the DRCS bus 64.

Referring now to FIG. 5, the DRCS 32d comprises a circuit breaker 58, a step-down transformer 62, a VSC system 150, a high pass filter 160 and an MSC 40. A small smoothing reactor 162 may be connected in series between the transformer 62 and the VSC system 150. Together, the VSC system 150 and the MSC 40 are operable to supply reactive power over a required range to the high voltage bus 16. The VSC system 150 is operable to supply continuously variable reactive power and is sized to cover the full negative reactive power range. The primary side of the transformer 62 is connected to the high voltage bus 16 by a line 72 with a circuit breaker 58 connected therein. The secondary side of the transformer 62 is connected to the DRCS bus 64. The MSC 40 is connected to the line 72 and is operable to supply positive reactive power in a stepped manner.

In the foregoing embodiments of the DRCS 32, the DRCS bus 64 typically has a voltage in a range of from about 480V to about 150 kV. Thus, the primary side voltage of the transformer 62 is typically in a range of from about 30 kV to about 765 kV or more and the secondary side voltage of the transformer 62 is typically in a range of from about 480V to about 150 kV, if the transformer 62 is needed.

While four different embodiments of the DRCS 32 have been shown and described, it should be appreciated that other embodiments of the DRCS 32 may be provided without departing from the scope of the present invention. These embodiments involve different combinations of the TCR 36, the TSC 38, the VSC system 150 and the MSC 40. For example, in DRCS 32d, the VSC system 150 could be used without an MSC 40. Also, the VSC system 150 could be used with a TCR 36 and one or more TSC's 38. In some embodiments, it may be desirable to use only power electronic devices (such as an SVC or a VSC) and not to use any mechanically switched devices, such as the MSC 40. Mechanical switching devices cannot be switched quickly. For example, the MSC 40 can only be switched every 5-10 cycles. In contrast, the SVC's 60, 70, 74 can switch twice a cycle. The VSC system 150 is even faster and can switch several hundreds of time during a single cycle.

In addition to having other, different configurations, the DRCS 32 may be connected to the generator bus (between the generator 12 and the step-up main transformer 14), instead of being directly connected to the high voltage bus 16. With this different connection, the various embodiments of the DRCS 32 would not require the step-down transformer 62.

Figure 6:
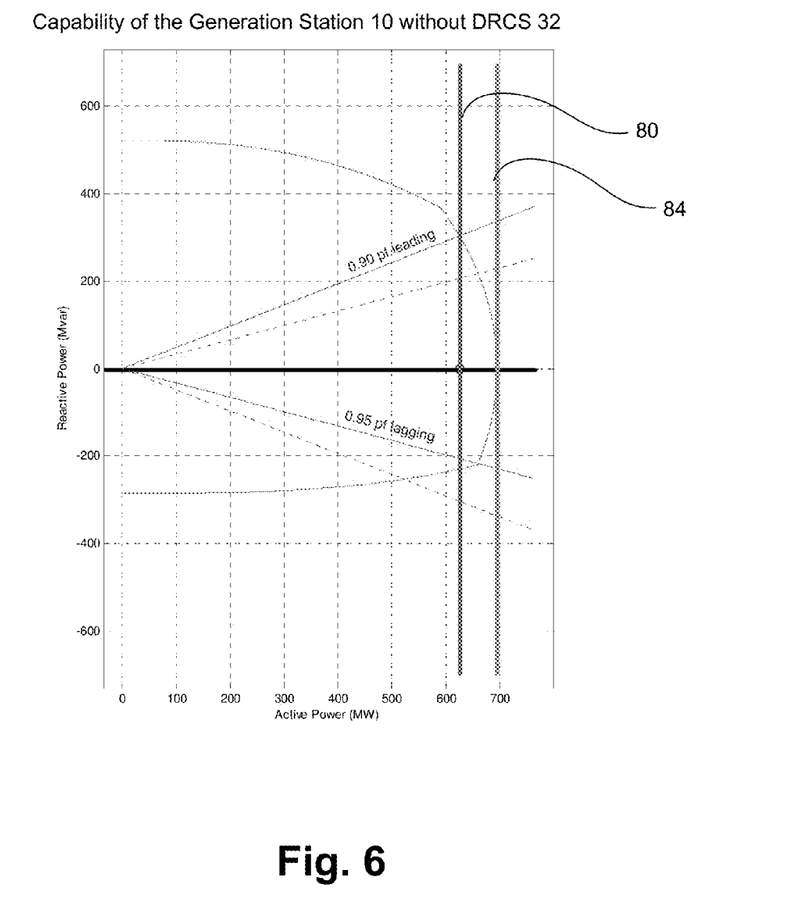
FIG. 6 is a curve of the generating capability of the generation station without the DRCS.

In a first exemplary application of the present invention, the generator 12 has a rated output of 695 MW of real power and can provide about ±52 Mvar. The generation station 10 is required to supply power at a power factor of 0.90 leading and 0.95 lagging. Without the DRCS 32, the generation station 10 can only supply 625.5 MW of real power because the generator 12 must supply reactive power in addition to the real power. A curve of the generating capability of the generation station 10 in this situation is shown in FIG. 6. Line 80 represents the real power without the DRCS 32 (625.5 MW), while the line 82 represents a desired real power output, e.g. 693 MW.

With the DRCS 32 installed and supplying reactive power, however, the generator 12 (and thus the generation station 10) can supply an increased amount of real power, namely the desired amount, such as 693 MW. This is an increase of 67.5 MW, or about 10.8%.

Figure 7:
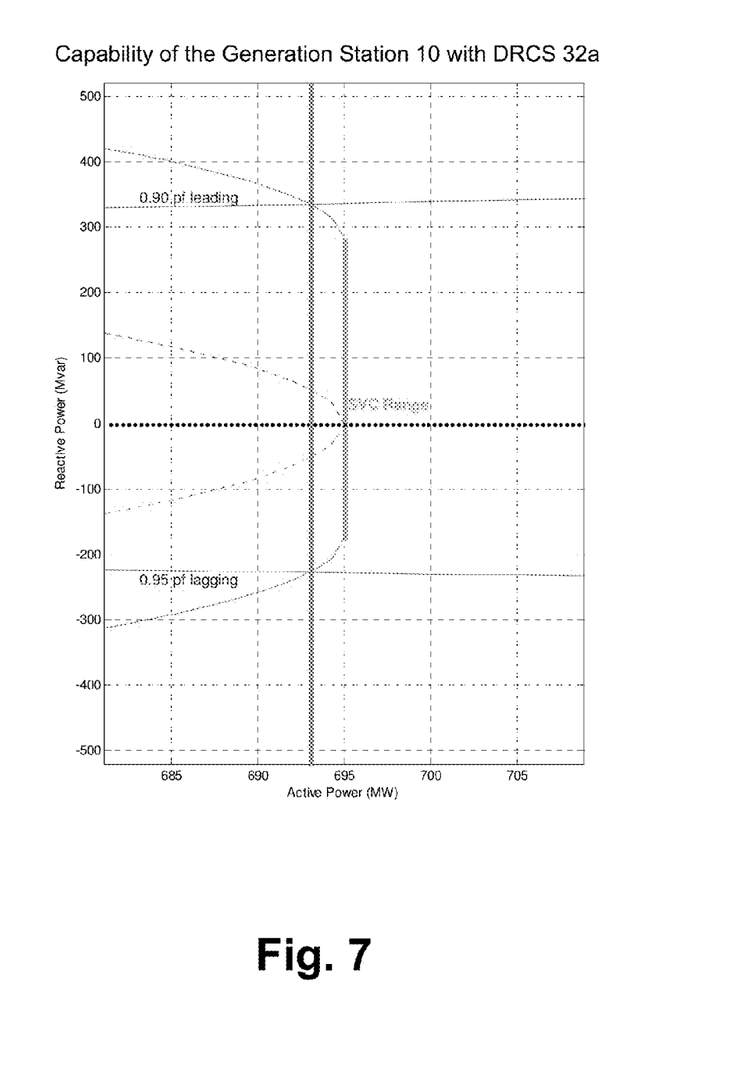
FIG. 7 is a curve of the generating capability of the generation station with the first embodiment of the DRCS.

A curve of the generating capability of the generation station 10 with the DRCS 32a installed for the first exemplary application is shown in FIG. 7. The DRCS 32a (SVC 60) is operable to continuously supply MVar in a range from −175 MVar to +283 MVvar. The TCR 36 is sized and operable to provide up to −208 MVar. Each of the TSC's 38 is sized and operable to provide +125 MVar. The harmonic filters 66 are sized and operable to provide +33 MVar.

Figure 8:
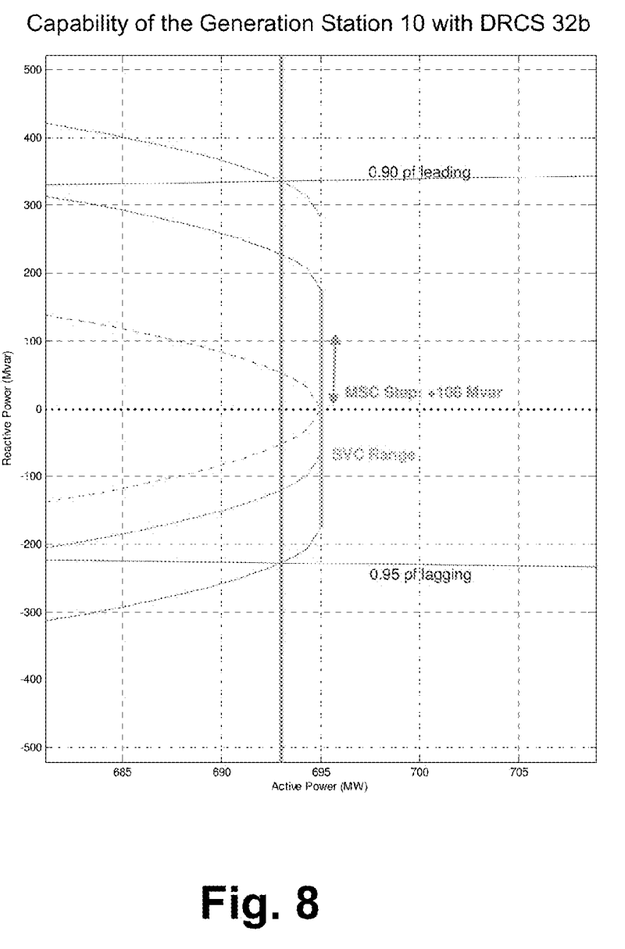
FIG. 8 is a curve of the generating capability of the generation station with the second embodiment of the DRCS.

A curve of the generating capability of the generation station 10 with the DRCS 32b installed for the first exemplary application is shown in FIG. 8. Overall, the DRCS 32b is operable to supply Mvar in a range from −175 Mvar to +283 Mvar. The SVC 70 is operable to continuously supply Mvar in a range from −175 Mvar to +175 Mvar, while the MSC 40 is operable to supply +108 Mvar. The TCR 36 is sized and operable to provide up to −208 MVar. The TSC 38 is sized and operable to provide +142 MVar. The harmonic filters 66 are sized and operable to provide +33 MVar.

Figure 9:
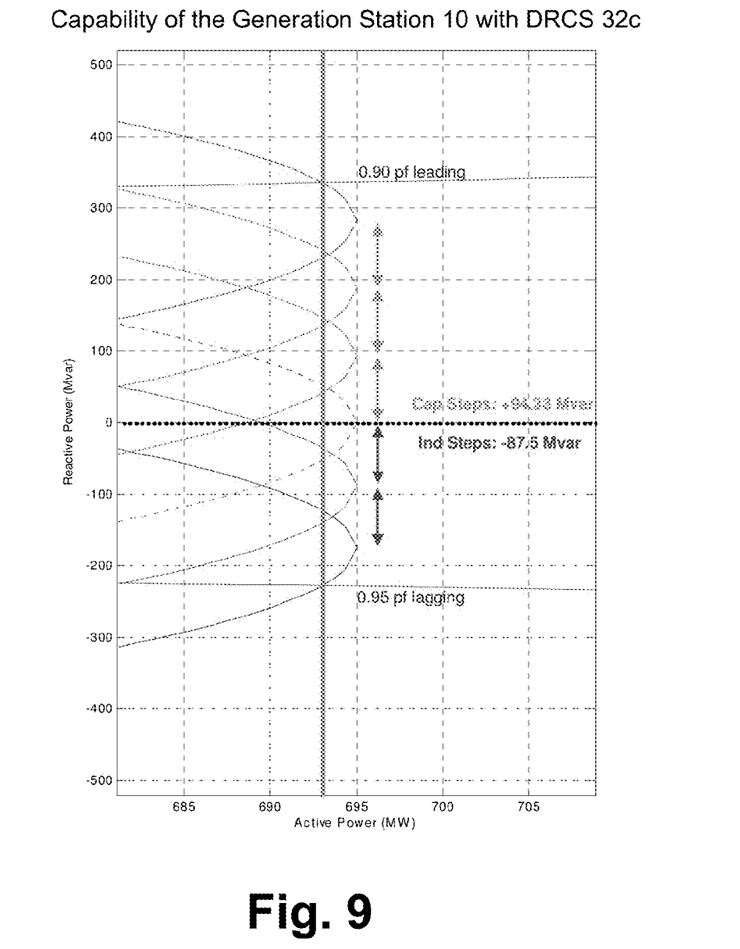
FIG. 9 is a curve of the generating capability of the generation station with the third embodiment of the DRCS.

A curve of the generating capability of the generation station 10 with the DRCS 32c installed for the first exemplary application is shown in FIG. 9. The DRCS 32c (SVC 74) is operable to supply Mvar in a stepped manner in a range from −175 Mvar to +283 Mvar. The DRCS 32c (SVC 74) can provide three steps of +94.33 Mvar each and two steps of −87.5 Mvar each. The TCR 36 is sized and operable to provide up to −175 MVar. A first TSC 38 is sized and operable to provide +163 MVar, a second TSC 38 is sized an operable to provide +80 MVar and a third TSC 38 is sized an operable to provide +40 MVar.

Figure 10:
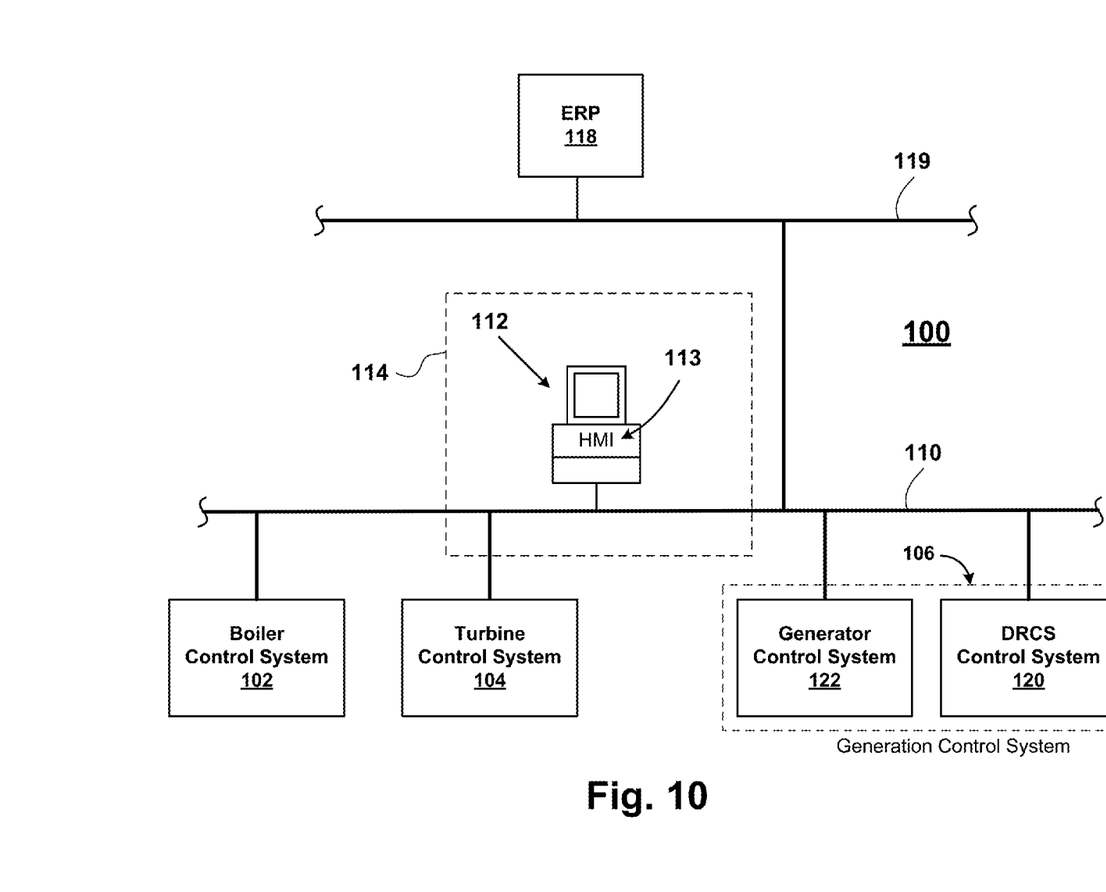
FIG. 10 is a schematic layout of a plant control system that controls the power generation station.

Referring now to FIG. 10, both the generator 12 and the DRCS 32 are controlled by a plant control system 100 that generally includes a boiler control system 102, a turbine control system 104 and a generation control system 106, all of which are connected to a local area network (LAN) 110. An operator work station 112 in a control room 114 of the generation plant 10 is connected to the LAN 110 and communicates with the boiler control system 102, the turbine control system 104 and the generation control system 106. The operator work station 112 may be an industrialized personal computer having a human machine interface 113 through which an operator may enter commands and data. The plant control system 100 may be connected to an enterprise resource planning (ERP) office 118 located in the generation plant 10 or in a location remote from the generation plant 10. If the ERP office 118 is located remotely, the plant control system 100 may be connected to the ERP office 118 over the Internet 119.

The generation control system 106 includes a DRCS control system 120 and a generator control system 122. The DRCS control system 120 communicates with the generator control system 122 over the LAN 110.

Figure 11:
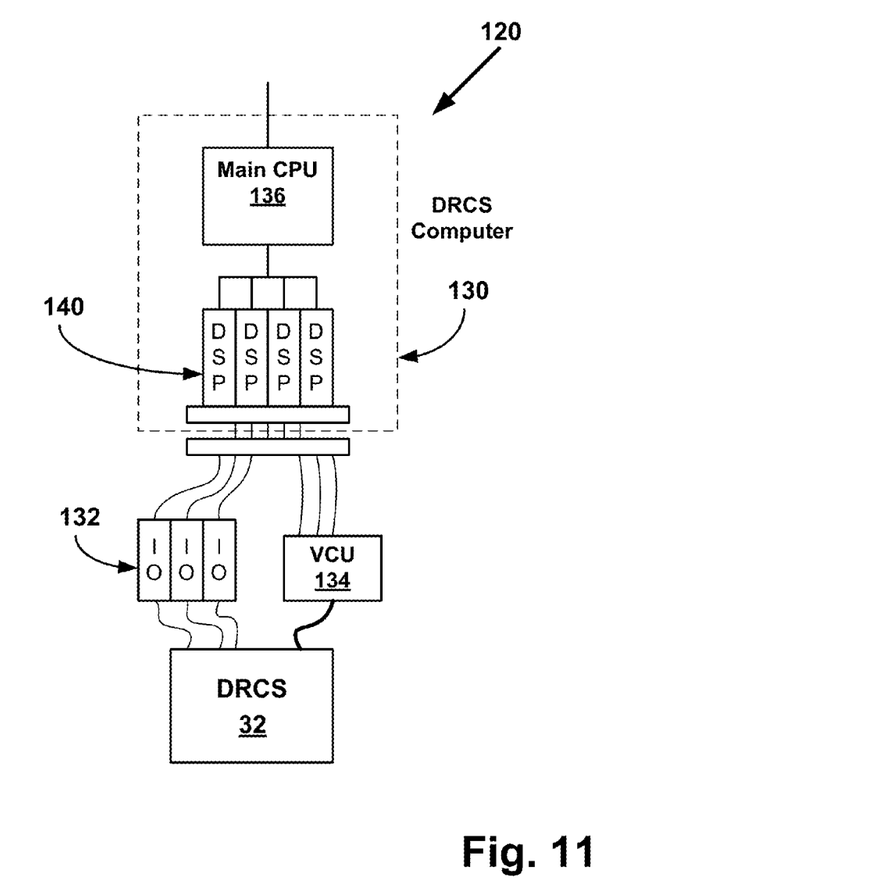
FIG. 11 is a schematic of a DRCS control system that is part of the plant control system.

Referring now to FIG. 11, the DRCS control system 120 includes a DRCS computer 130, I/O racks 132 and a valve control unit (VCU) 134. The DRCS computer 130 includes a main CPU 136 and a plurality of digital signal processor (DSP) boards 140. High speed applications, such as the generation of fast firing control pulses for the thyristor valves 44, are run in the DSP boards 140, while less demanding functions, such as sequence and interlocking schemes, are run in the main CPU 136. The DRCS computer 130 communicates with the VCU 134 and the I/O racks 132 by field buses, such as CAN buses.

Inside the VCU 134, control pulses from the DSP boards 140 are received by a central unit board. From the central unit board, the control pulses are passed on to optical units (one unit per phase and direction), where they are converted to short optical firing pulses and transmitted via light guides to control units located in the thyristor valves 44. The control units convert the optical firing pulses to electrical firing pulses that are provided to the gates of the thyristor valves 44.

Control signals generated by the DRCS computer 130 for devices, such as the MSC 40, are transmitted from the DRCS computer 130 to the I/O racks 132. The I/O racks 132 are connected by wiring to the devices.

During normal operation of the generation plant 10, the generator control system 122 determines MVar requirements for the DRCS 32 based on the load demand for the generation plant 10. The load demand includes the real power and the power factor that are required. The load demand may be automatically determined by the generator control system 122, may be received from an operator who has manually entered it through the HMI 113 of the operator work station 112, or may be received from a transmission operator. The generator control system 122 transmits the MVar requirements to the DRCS control system 120 over the LAN 110.

In the event of an emergency, such as a voltage spike or voltage sag, the generator control system 122 may automatically command the DRCS 32 to supply all available positive reactive power (for a voltage sag) or all available negative reactive power (for a voltage spike).

As is conventional, the generation station 10 includes an auxiliary power system that provides power to electric motors driving auxiliary devices, such as pumps, fans and compressors. These auxiliary devices perform tasks such as pumping feedwater to boiler(s) and providing combustion air and fuel to burners. The electric motors driving the auxiliary devices may be provided with power through adjustable speed drives having active rectifier units. An auxiliary power control system may be provided that is operable to control the adjustable speed drives and capacitance sources of the auxiliary power system so as to control the power factor of the auxiliary power system while providing steady state voltage regulation and dynamic voltage support. Such an auxiliary power control system is disclosed in PCT Application No.: PCT/US2010/053822, entitled "Method and Apparatus for Improving the Operation of an Auxiliary Power System of a Thermal Power Plant", which was filed on Oct. 22, 2010 and claims priority from U.S. (provisional) Patent Application No. 61/254,708 filed on Oct. 25, 2009; both of the foregoing patent applications being incorporated herein by reference.

The operation of the DRCS 32 may be coordinated with the auxiliary power control system. This coordination may include having the auxiliary power system provide a portion of the MVar requirement that would otherwise be provided by the DRCS 32. In such a situation, the DRCS 32 and the auxiliary power system would together provide a majority of the reactive power that is required to be output from the generation station 10. Of course, the portion provided by the auxiliary power system would be much less than the DRCS 32.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method of improving power generation in a thermal power plant having a power generator connected to a high voltage bus, the method comprising:
   providing a dynamic reactive compensation system (DRCS) comprising one or more sources of negative reactive power and one or more sources of positive reactive power, the one or more sources of negative reactive power comprising one or more power electronic devices;
   connecting the DRCS in shunt to the high voltage bus of the power plant;
   receiving a load demand for the thermal power plant, the load demand comprising required real power and a required power factor;
   determining required reactive power from the load demand;
   operating the DRCS to provide most of the required reactive power required to be provided from the thermal power plant.

2. The method of claim 1, wherein the step of operating the DRCS comprises providing reactive power to the high voltage bus so as to increase the real power that is output from the power plant from 5% to 15%, while meeting the required power factor.

3. The method of claim 1, wherein the one or more sources of negative reactive power are selected from the group consisting of: thyristor controlled reactors (TCRs) and voltage source converters (VSCs) and combinations of the foregoing.

4. The method of claim 3, wherein the DRCS comprises:
   a DRCS bus; and
   a step-down transformer having a primary side connected to the high voltage bus by a DRCS line and a secondary side connected to the DRCS bus; and
   wherein the one or more sources of negative reactive power and the one or more sources of positive reactive power are connected to the DRCS bus in a parallel manner.

5. The method of claim 4, wherein the one or more sources of negative reactive power comprise a TCR and wherein the one or more sources of positive reactive power comprise a TSC.

6. The method of claim 5, wherein the step of operating the DRCS comprises operating the TCR in a continuous manner and operating the TSC in a stepped manner.

7. The method of claim 6, wherein the DRCS further comprises a harmonic capacitor bank connected to the DRCS bus in parallel with the TCR and the TSC.

8. The method of claim 6, wherein the one or more sources of positive reactive power further comprises a capacitor connected by a circuit breaker to the DRCS line, and wherein the step of operating the DRCS comprises operating the capacitor in a stepped manner.

9. The method of claim 5, wherein the one or more sources of negative reactive power comprise a TCR and wherein the one or more sources of positive reactive power comprise more than two TSCs, and wherein the step of operating the DRCS comprises operating the TCR and the TSCs in a stepped manner.

10. The method of claim 5, wherein the TCR comprises a bi-directional thyristor valve connected in series with a pair of reactors, and wherein the TSC comprises a bi-directional thyristor valve connected in series with one or more capacitors.

11. The method of claim 4, wherein the one or more sources of negative power further comprises:
a VSC connected in parallel with a DC bus; and
a high pass filter; and
wherein the VSC and the high pass filter are connected in parallel to the DRCS bus.

12. The method of claim 11, wherein the one or more sources of positive reactive power comprise a capacitor connected by a circuit breaker to the DRCS line, and wherein the step of operating the DRCS comprises operating the capacitor in a stepped manner.

13. The method of claim 1, further comprising:
providing a DRCS control system operable to control the DRCS;
connecting the DRCS control system to the DRCS through a local area network; and
connecting the DRCS control system to a generator control system operable to control the power generator.

14. The method of claim 13, wherein the the load demand is received in the DRCS control system from the generator control system.

15. The method of claim 1, wherein the DRCS is connected to the high voltage bus of the power plant so as to be connected in parallel with the power generator.

16. The method of claim 1, wherein the DRCS is connected to the high voltage bus of the power plant so as to be connected in series with the power generator.

17. The method of claim 1, wherein the thermal power plant comprises an auxiliary power system for providing power to electric motors driving auxiliary devices, the electric motors being provided with power through adjustable speed drives; and wherein the method further comprises:
controlling the adjustable speed drives to provide a portion of the reactive power required to be provided from the power plant.

18. A thermal power plant comprising:
a high voltage bus for connection to a transmission network;
a power generator connected to the high voltage bus; and
a dynamic reactive compensation system (DRCS) connected in shunt to the high voltage bus and comprising one or more sources of negative reactive power and one or more sources of positive reactive power, the one or more sources of negative reactive power comprising one or more power electronic devices, the DRCS being operable to provide most of the reactive power required to be provided from the thermal power plant.

19. The thermal power plant of claim 18, wherein the DRCS is operable to provide from ±1 to ±600 mega volt-amperes reactive.

20. The thermal power plant of claim 18, wherein the one or more sources of negative reactive power are selected from the group consisting of: thyristor controlled reactors (TCRs), thyristor switched capacitors (TSCs), voltage source converters (VSCs) and combinations of the foregoing.

* * * * *